US009360039B2

(12) United States Patent
Endt et al.

(10) Patent No.: US 9,360,039 B2
(45) Date of Patent: Jun. 7, 2016

(54) CAGE NUT HAVING A RETAINING DEVICE AND METHOD FOR PRODUCING SAME

(75) Inventors: Thomas Endt, Rüsselsheim (DE); Rainer Krauss, Brettheim (DE); Siegfried Oberndörfer, Gerabronn (DE); Stefan Neuhäuser, Niedernhausen (DE)

(73) Assignees: Ruia Global Fasteners AG, Neuss (DE); GM Global Technology Operations LLC., Detroit, MI (US)

( * ) Notice: Subject to any disclaimer, the term of this patent is extended or adjusted under 35 U.S.C. 154(b) by 277 days.

(21) Appl. No.: 13/996,079

(22) PCT Filed: Dec. 16, 2011

(86) PCT No.: PCT/EP2011/006378

§ 371 (c)(1), (2), (4) Date: Jul. 26, 2013

(87) PCT Pub. No.: WO2012/084163

PCT Pub. Date: Jun. 28, 2012

(65) Prior Publication Data

US 2013/0326860 A1 Dec. 12, 2013

(30) Foreign Application Priority Data

Dec. 23, 2010 (DE) ........................ 10 2010 055 554

(51) Int. Cl.
*F16B 37/00* (2006.01)
*F16B 37/04* (2006.01)

(52) U.S. Cl.
CPC ......... *F16B 37/044* (2013.01); *Y10T 29/49948* (2015.01)

(58) Field of Classification Search
CPC .... F16B 37/044; F16B 37/045; F16B 37/046; F16B 37/00
USPC .......................... 411/104, 432, 900, 907–908
See application file for complete search history.

(56) References Cited

U.S. PATENT DOCUMENTS 5,489,173 A * 2/1996 Hofle .................... F16B 37/046 411/104
5,779,412 A * 7/1998 Nagai ..................... E04B 2/766 411/104

(Continued)

FOREIGN PATENT DOCUMENTS

DE 9409087 U1 8/1994
DE 202010006746 U1 8/2010

*Primary Examiner* — Roberta Delisle
(74) *Attorney, Agent, or Firm* — Gable Cotwals

(57) ABSTRACT

The invention relates to a cage nut (1) having a retaining device, and to a method for producing the same. The cage nut (1) comprises a nut (4) having a radially protruding rectangular flange (5) and a threaded sleeve-like seat (6) for a screw. A retaining means (7) having a through-opening (8), through which the sleeve-like screw seat (6) passes, engages in a bracket-like manner over the rectangular flange (5) of the nut. A retaining collar (9), which surrounds the sleeve-like screw seat (6) of the nut (4), is supported on the retaining means (7) in the region of the through-opening (8). The retaining collar (9) is one-piece and has first and second cover elements (10, 11) covering the through-opening (8) of the retaining means (7) on both sides. The cover elements (10, 11) are mechanically connected via a connecting bush (12) concentrically adjoining the screw seat (6). The connecting bush (12) is radially spaced from the through-opening (8).

10 Claims, 3 Drawing Sheets

31 33 4 21 6 20 $d_1$ 5 $b_1$ $l_1$ 18 19 32

7 8 13 30 28 $d_3$ $b_3$ A 34 29 37 B 27 36 35

(56) References Cited

U.S. PATENT DOCUMENTS 7,086,817 B2 * 8/2006 Clinch .................. F16B 37/065 411/103
7,544,028 B2 * 6/2009 Tournier ............... F16B 37/046 411/121
8,277,158 B2 * 10/2012 Csik ...................... F16B 37/046 411/111
9,080,592 B2 * 7/2015 Oberndorfer ......... F16B 37/044

* cited by examiner

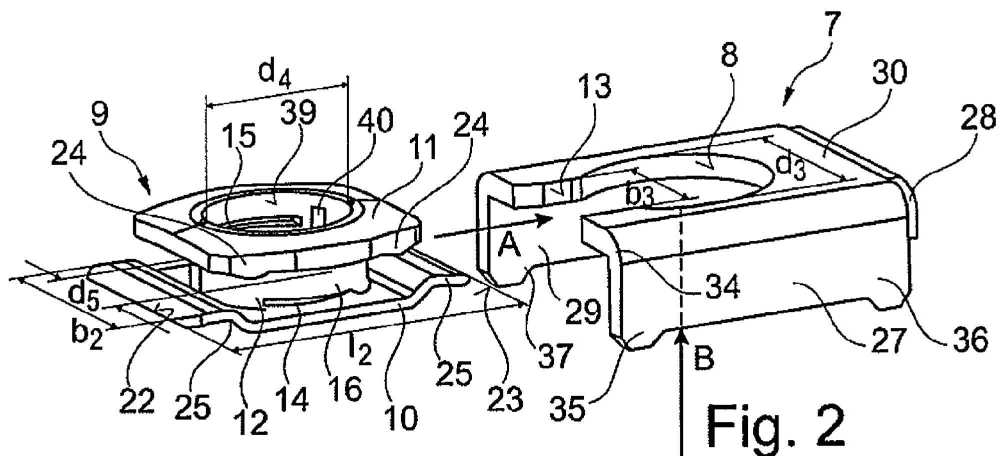
Fig. 3
Fig. 2
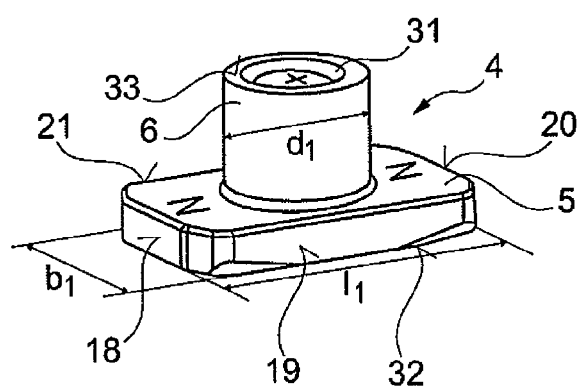
Fig. 1
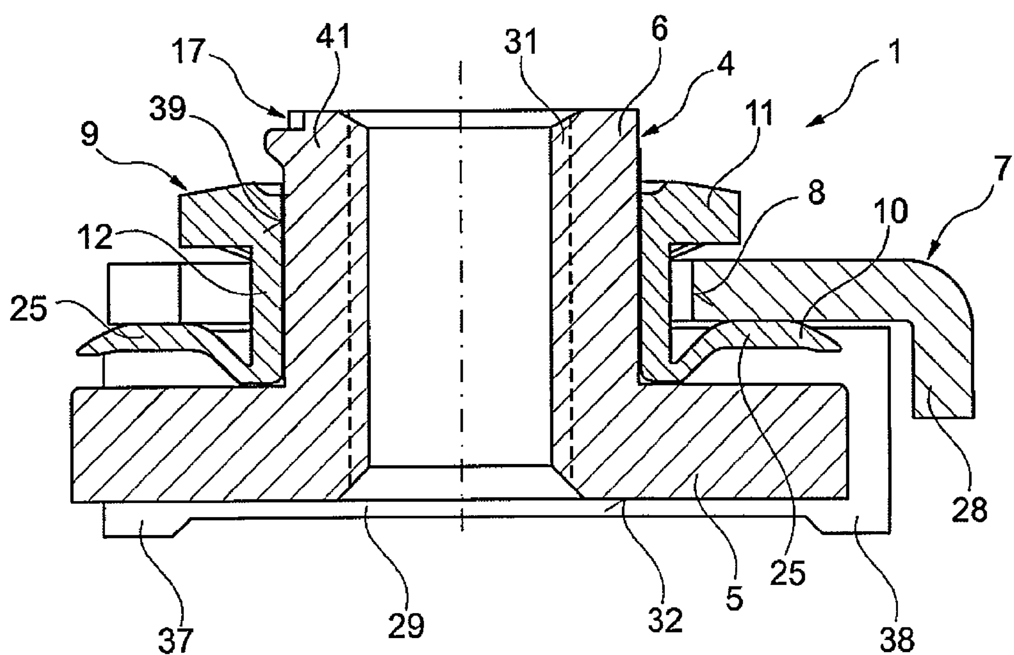
Fig. 4

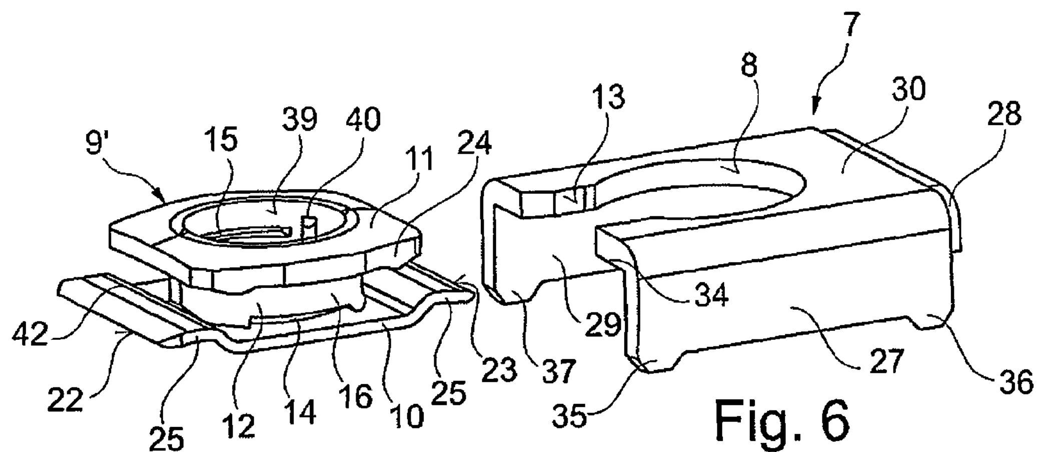
Fig. 7
Fig. 6
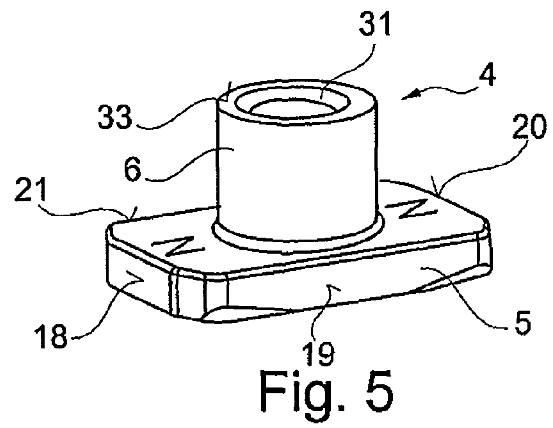
Fig. 5
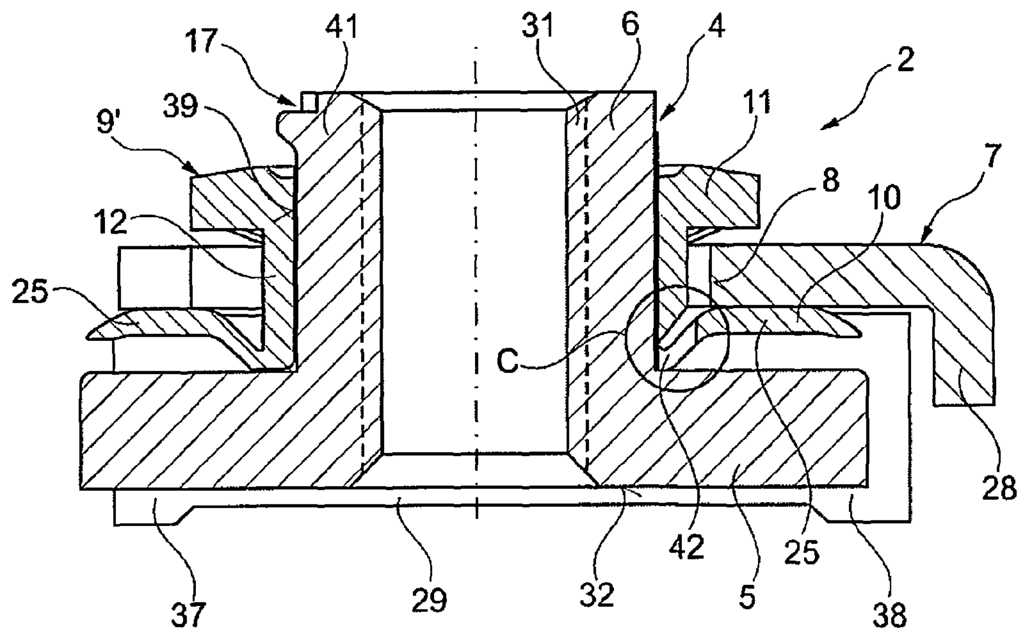
Fig. 8

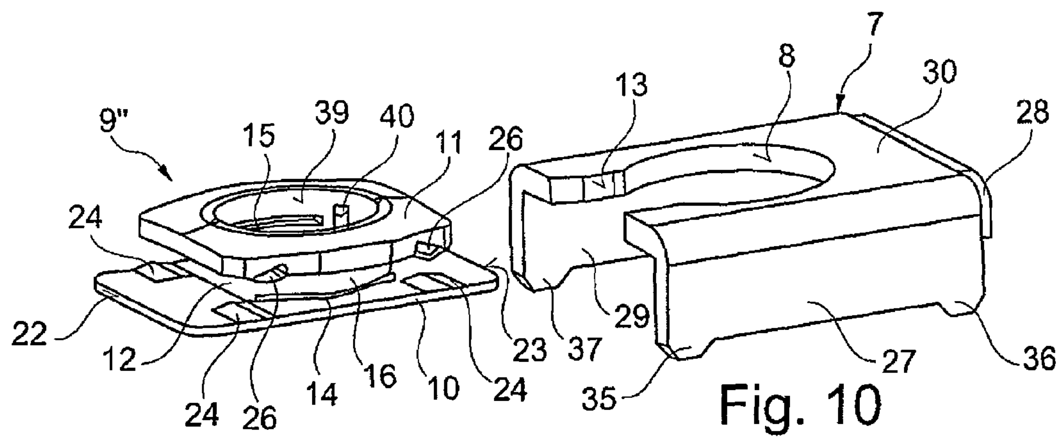
Fig. 11
Fig. 10
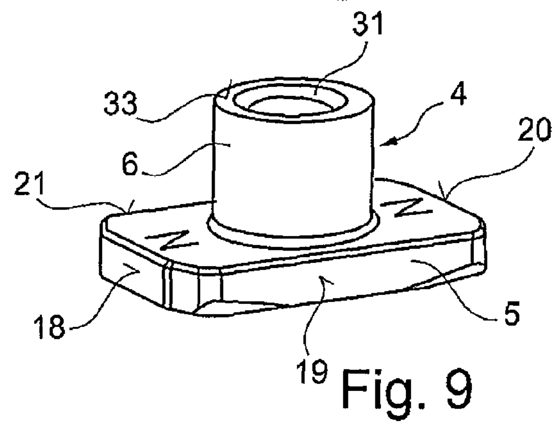
Fig. 9
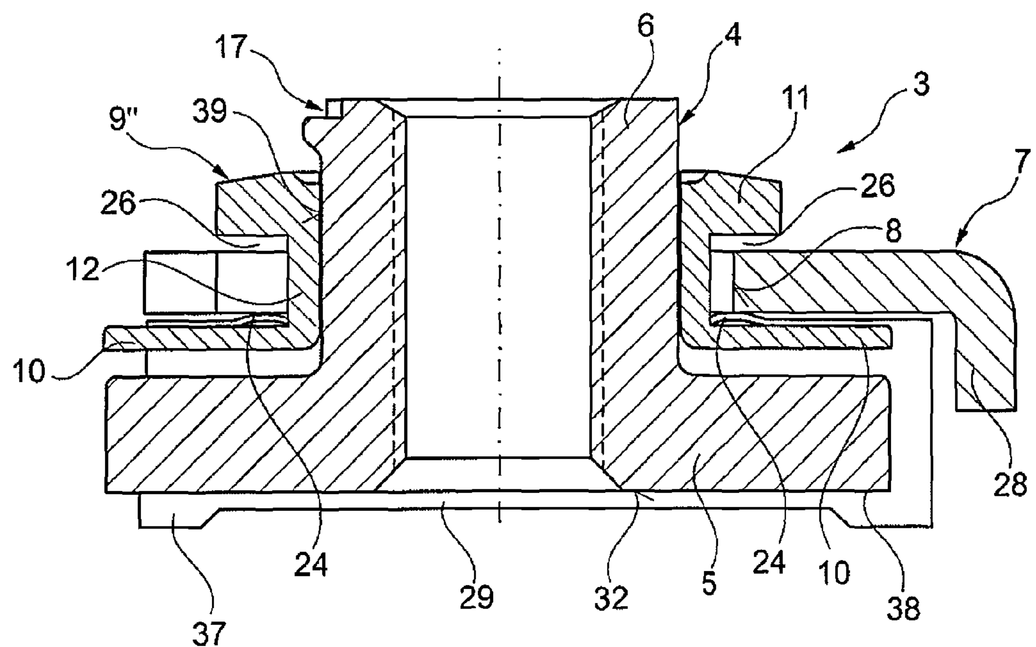
Fig. 12

CAGE NUT HAVING A RETAINING DEVICE AND METHOD FOR PRODUCING SAME

CROSS-REFERENCE TO RELATED APPLICATIONS

This application is the United States National Phase of PCT Patent Application No. EP2011/006378 filed on 16 Dec. 2011, which claims priority to German Patent Application No. 10 2010 055 554.1 filed 23 Dec. 2010, both of which are incorporated herein by reference.

A cage nut comprising a retaining device and a method for producing said cage nut are described. The cage nut comprises a nut comprising a radially protruding angular flange and a threaded-sleeve-like receptacle for a bolt. A holder comprising a passage opening, through which the sleeve-like bolt receptacle passes, engages in a bracket-like manner over the angular flange of the nut. A retaining collar, which surrounds the sleeve-like bolt receptacle of the nut, is supported on the holder in the region of the passage opening.

A cage nut of this type is known from DE 94 09 087 U1 as a retaining device for a nut. Cage nuts of this type are used as part of a nut and bolt connection, components, such as motor vehicle engines or seats in a vehicle, being attached by means of the cage nuts to an abutment of the body of the vehicle. In order to simplify assembly, the cage nut is pre-assembled by means of the holder in the region of the passage opening of the abutment, which opening is designated for the screw bolts. For this purpose, the holder is rigidly connected to the abutment and, in the installation position, engages over the nut which is loosely arranged inside said holder.

During subsequent screwing of a screw bolt into the nut thread of the threaded-sleeve-like bolt receptacle, the holder provides rotationally fixed support for the radially protruding flange which is provided on the nut. At the same time, the holder prevents the nut from yielding in the axial direction of the screw bolt. Accordingly, the screw bolt can be screwed into the nut without said nut having to be fixed manually or by using corresponding tools.

In order to compensate assembly tolerances between a component to be assembled, such as an engine or a seat of a vehicle and the fastening points provided in the body comprising a cage nut, the nut is retained in the holder with play. Accordingly, a gap remains between the radial outer periphery of the threaded-sleeve-like bolt receptacle of the nut and the passage opening on the holder. As a result, when using the known holder, there is a risk that the nut in the holder may tilt against the axial orientation of the screw bolt. Owing to the tilting movement of the nut, it becomes difficult to screw the screw bolt into the internal thread of the nut in a coaxial direction.

Furthermore, nuts in the conventional holders cause a disturbing rattling noise when the cage nut is provided for the component at a plurality of fixing points in order for it to be possible to use a plurality of variants of the components at any time. Excess cage nuts, which are used in correspondence with the assembly requirements of a plurality of different component variants, can move relative freely in the holder in this case and as a result can cause these disturbing rattling noises particularly inside a vehicle, especially since the nuts can move freely in the known holders in an axial and radial direction and turning of the angular flange region may lead to disturbing metallic impact noises which give the impression that this model has been unsafely and incorrectly assembled.

The problem addressed by the application is that of providing a cage nut in which the risk of tilting is reduced and noise is suppressed for cage nuts which have been assembled and fixed as a precautionary measure. A method is further specified, using which a cage nut of this type can be produced.

This problem is solved by the independent claims. Advantageous developments emerge from the dependent claims.

As a solution to this problem, a cage nut comprising a retaining device and a method for producing said cage nut are described. The cage nut comprises a nut comprising a radially protruding angular flange and a threaded-sleeve-like receptacle for a bolt. A holder comprising a passage opening, through which the sleeve-like bolt receptacle passes, engages in a bracket-like manner over the angular flange of the nut. A retaining collar, which surrounds the sleeve-like bolt receptacle of the nut, is supported on the holder in the region of the passage opening. The retaining collar is in one piece and comprises first and second cover elements covering the passage opening of the holder on both sides. The cover elements of the one-piece retaining collar are mechanically connected via a connecting bush which concentrically adjoins the bolt receptacle. The connecting bush is radially spaced apart from the passage opening.

An advantage of this cage nut comprising a retaining device is that when assembling the cage nut, the number of parts to be interconnected is reduced to three elements, specifically a specially shaped cage nut, a holder and a retaining collar, such that a cage nut of this type in the holder thereof can be cost-effectively produced. A further advantage consists in that, owing to the fact that the retaining collar is in one piece, the displaceability of the nut is ensured while maintaining the axial orientation thereof in the passage opening.

In addition, the nut is fixed by the retaining collar in the axial direction such that tilting of the axis of the nut within the holder is no longer possible owing to the one-piece retaining collar. Lastly, the axial movement of the nut and the turning of the angular flange are restricted to such an extent that metallic touching or contact, which causes noise, between the holder and the nut is prevented by the one-piece retaining collar. Owing to the retaining collar, the radial displacement which is permitted within limits does not lead to any metallic contact between the metal nut and the metal holder. Noise from unused positions having a cage nut is thus prevented.

In a further embodiment, the holder of the cage nut comprises an insertion slot for the retaining collar for inserting the retaining collar into the passage opening. Said insertion slot has an opening width which is, however, less than the outer diameter of the connecting bush of the one-piece retaining collar. It is therefore provided that the connecting bush comprises respectively opposing slots at the transitions into the cover elements, such that a resilient portion is formed on both sides of the threaded bush, which portion yields into the insertion slot when the retaining collar is pushed in and springs back to its original shape when it reaches the passage opening. Owing to this springing back, permanent protection against loss is achieved as soon as the threaded-sleeve-like bolt receptacle is pushed into the retaining collar.

It is further provided that, in order to fix the cage nut in the retaining collar, the threaded-sleeve-like bolt receptacle projects beyond the one-piece retaining collar and comprises caulked points distributed over the periphery of the projecting region.

Said caulked points can be made in a compression press by a punch in a simple manner, and are usually distributed over three points on the periphery of the projecting end of the bolt receptacle. The depth of the caulked points can be set in the compression press. By setting the size of the caulked point, the sliding displaceability of the one-piece retaining collar on the holder in the region of the passage opening can finally be set, especially since, when caulking, the one-piece retaining collar is clamped between the radially protruding angular flange and the caulked points.

Furthermore, it is provided that the first cover element of the one-piece retaining collar is arranged between the protruding angular flange and the holder and projects beyond the edge faces of the angular flange. Owing to this projection of the first cover element beyond the edge of the angular flange, it is additionally ensured that radial displacements of the nut and thus the angular flange in the holder cannot lead to metallic contact, which causes noise, between the holder and the nut. This promotes protection against noise and ensures complete electrical insulation between the nut and the holder.

The complete insulation of the nut having an internal thread provides a further advantage, in which, for example during subsequent coating operations in a bath for cathodic dip coating, only the holder of the cage nut, which holder is welded to the body, is coated. Since the nut itself cannot be exposed to the coating potential, the coating remains limited to the metal holder. The nut itself, which is electrically insulated by the one-piece retaining collar made of plastics material, and in particular the internal thread thereof, remains free of a coating layer despite the metallically conductive cage. In addition, it is provided that the second cover element, which is supported on the holder, does not project beyond the holder itself and is preferably disc-shaped. The outer dimensions of the cage nut are thus determined by the holder.

In a further embodiment, the first cover element is a plate which is arranged between the protruding angular flange and the holder, said plate comprising resiliently pretensioned wave-shaped indentations at the edges transverse to the insertion slot relative to the holder. When pushing the retaining collar into the insertion slot, said resiliently pretensioned wave-shaped indentations ensure that the connecting bush is axially oriented and the nut can be positioned in a resiliently pretensioned axial orientation in the connecting bush without problems.

It is additionally provided that the second cover element, which rests on the holder, comprises bulges. Said bulges are provided such that the second cover element, when pushed into the insertion slot, can pretension the resilient wave-shaped indentations of the first cover element on the holder. The second cover element can be correspondingly formed and can either comprise pretensioned spring elements if the first cover element comprises corresponding bulges in order to press the spring elements of the second cover element against the holder, or the second cover element can comprise corresponding bulges in order to pretension the above-mentioned pretensioned wave-shaped indentations of the first cover element against the holder in the region of the passage opening. These embodiments are presented in detail in the figures below.

In addition to the above-mentioned radial slots in the transition regions between the cover element and the connecting bush for forming spring elements of the connecting bush and for forming the wave-shaped indentations or bulges of the cover elements, a further measure is provided for improving the radially displaceable seat of the nut in the passage opening. For this purpose, further transverse slots are provided in the connecting element. Said transverse slots are provided so as to be parallel to the resilient wave-shaped indentations and transverse to the insertion slot in the transition of the connecting element to the first cover element. Said additional slots in the connecting bush which are positioned transverse to the insertion slot and parallel to the wave-shaped indentations or to the bulges do weaken the connecting bush, which mechanically connects the first and the second cover element of the one-piece retaining collar, but are not undercut or cut so deeply as to impair the coherence of the one-piece retaining collar. These free cuts make it possible to arrange the resilient wave-shaped indentations closer to the connecting bush and thus to produce a larger region of action having pretensioning.

A further embodiment provides that the radially protruding angular flange is rectangular. In this case, the holder comprises three angled legs of a base plate comprising the passage opening, the three legs engaging over three edge faces of the rectangular flange of the nut. By means of these three legs, the cage nut can be securely welded to a fixing position of the body region and at the same time, the nut can be fastened in the holder and in the fixing position in a rotationally fixed but radially displaceable manner via the rectangular flange.

The displaceability of the nut within the holder does depend on the requirements of the tolerance ranges in manufacturing, but it is provided that the nut comprising the retaining collar which is pretensioned in the holder has greater radial displacement in the direction of the insertion slot than in the direction transverse to the insertion slot. The cage nut can thus be prefabricated with a relatively high elongate slot length and low elongate slot width such that the threaded-sleeve-like bolt receptacle can be displaced into the position of a screw bolt.

While, as already mentioned above, the nut and the holder comprise metal alloys, the one-piece retaining collar can be manufactured from plastics material. A plastics material of this type should be dimensionally stable and nevertheless have resilient properties in order to provide the various resilient elements for the cover plates of the cover elements.

A method for producing a cage nut has the following method steps. Firstly, a plurality of bracket-shaped holders comprising a base plate and three angled legs and a passage opening comprising an insertion slot in the base plate are punched out of a sheet metal plate. This can take place in a single punching step, such that mass production of bracket-shaped holders of this type is possible. Nuts are then produced which comprise a radially protruding angular flange and have a threaded-sleeve-like bolt receptacle for a bolt.

After punching and then production of these two components for a cage nut, or at the same time, a retaining collar can be injection moulded, the retaining collar comprising two cover elements which can cover the passage opening of the holder on both sides and is provided with a connecting bush which connects the cover elements. Now that these three components are available for the cage nut, the retaining collar is first put onto the base plate of the holder via the insertion slot until the cover elements cover the edge regions of the passage opening on both sides.

The threaded-sleeve-like bolt receptacle of the nut is then axially displaced into the connecting bush of the retaining collar in the passage opening. An end of the threaded-sleeve-like bolt receptacle is then caulked, which end projects from the retaining collar, to an axially oriented cage nut which is radially displaceably mounted in the passage opening. In this last method step, the contact pressure of the two cover elements on the edge region of the passage opening in the holder can additionally be set.

This method has the advantage that the cage nuts can be produced using relatively cost-effective manufacturing means and tools and are fixed in the holder such that they are indeed slidingly displaceable in the radial direction and remain axially oriented, but the nut cannot move in the axial direction such that noise occurs or tilting is possible.

A compression press using a caulking punch is provided for the caulking, the entire projecting end of the bolt receptacle not being caulked in an annular manner, but caulking rather only taking place at three positions distributed over the periphery.

A method for fixing components in a vehicle using a plurality of cage nuts according to the above embodiments and using appropriate bolts provides that vehicle seats are fixed to profiled rails in the vehicle or engines are fixed to panels in an engine chamber of the vehicle, after which legs of the holders of the cage nuts are welded onto the profiled rails or onto the panels at predetermined fixing positions of abutments. In this case, it is advantageously possible to provide fixing points which are provided for other ranges of models for example in seat fixing, without said cage nuts having to be fixed using blind screws or stoppers. The cage nuts are arranged so as to be secured in the holder solely by the one-piece retaining collar such that shocks cannot trigger any sources of noise or loosen the nut from said retaining collar.

Embodiments are now described in greater detail with reference to the appended figures, in which:

FIG. 1 is a schematic perspective view of a nut for a cage nut according to a first embodiment;

FIG. 2 is a schematic perspective view of a holder for the cage nut according to the first embodiment;

FIG. 3 is a schematic perspective view of a retaining collar for the cage nut according to the first embodiment;

FIG. 4 is a schematic longitudinal section through the cage nut according to the first embodiment;

FIG. 5 is a schematic perspective view of a nut for a cage nut according to a second embodiment;

FIG. 6 is a schematic perspective view of a holder for the cage nut according to the second embodiment;

FIG. 7 is a schematic perspective view of a retaining collar for the cage nut according to the second embodiment;

FIG. 8 is a schematic longitudinal section through the cage nut according to the second embodiment;

FIG. 9 is a schematic perspective view of a nut for a cage nut according to a third embodiment;

FIG. 10 is a schematic perspective view of a holder for the cage nut according to the third embodiment;

FIG. 11 is a schematic perspective view of a retaining collar for the cage nut according to the third embodiment; and FIG. 12 is a schematic longitudinal section through the cage nut according to the third embodiment.

FIG. 1 is a schematic perspective view of a nut 4 for a cage nut according to the first embodiment. Said nut 4 comprises an approximately angular flange 5, from which a bolt receptacle 6 for a screw bolt projects. Said nut 4 comprises a continuous internal thread 31, which stretches from the flange underside 32 to a projecting end 33 of the bolt receptacle 6. The radially protruding flange 5 is rectangular in this embodiment and has four edge faces 18, 19, 20 and 21. The length of the flange 5 between the edge face 18 and the edge face 20 is $l_1$ and the width of the flange 5 between the edge face 19 and the edge face 21 is $b_1$.

FIG. 2 is a schematic perspective view of a holder 7 for the cage nut according to the first embodiment. The holder 7 comprises a base plate 30 in which a passage opening 8 is provided, through which the threaded-sleeve-like bolt receptacle 6 of the nut 4 shown in FIG. 1 can be inserted. The diameter $d_3$ of said passage opening 8 is considerably less than the diameter $d_1$, shown in FIG. 1, of the bolt receptacle. The base plate 30 is bent on three sides to form legs 27, 28 and 29, which can engage over the edge faces 19, 20 and 21, shown in FIG. 1, of the flange 5.

An edge face 34 which does not comprise a leg of this type has an insertion slot 13, of which the width $b_3$ is less than the diameter $d_3$ of the passage opening 8. In addition, the opposing legs 27 and 29 comprise foot elements 35, 36 and 37, by means of which the holder 7 can be welded onto an abutment of a vehicle body. The legs 27 and 29 then engage over the edge faces 19 and 21, shown in FIG. 1, of the radially protruding flange 5.

FIG. 3 is a schematic perspective view of a retaining collar 9 for the cage nut according to the first embodiment. Said retaining collar 9 is in one piece and is composed of three components, specifically of a first cover element 10, which can cover the passage opening 8 shown in FIG. 2 from below, of a second cover element 11, which can cover the passage opening 8 shown in FIG. 2 from above, and of a connecting bush 12 arranged therebetween, which mechanically interconnects the two cover elements 10 and 11.

The inner diameter $d_4$ of the connecting bush 12 is dimensioned such that it corresponds to the outer diameter $d_1$ of the bolt receptacle 6 of the nut 4 in FIG. 1, additional inner beads 40 ensuring a press fit of the bolt receptacle 6 when assembling the cage nut. The outer diameter $d_5$ of the connecting bush 12 is less than the inner diameter $d_3$ of the passage opening 8 shown in FIG. 2. As a result, sufficient play between the one-piece retaining collar 9 and the holder 7 inside the passage opening 8 of the holder 7 shown in FIG. 2 is ensured. The outer diameter $d_5$ of the connecting bush 12 of the retaining collar 9 is also less than the width $b_3$ of the insertion slot 13 of the holder 7 shown in FIG. 2.

When pushing the retaining collar 9 into the passage opening 8 of the holder 7 in arrow direction A via the insertion slot 13, as shown in FIG. 2, the retaining collar 9 would therefore remain caught on the insertion slot 13. In order to prevent this, the connecting bush 12 comprises radial slots 14 and 15 at the transitions of the connecting bush 12 to the cover elements 10 and 11, such that opposing spring elements 16 emerge. When inserting the retaining collar 9 into the insertion slot 13 in arrow direction A, said spring elements 16 of the connecting bush 12 yield and make it possible to position the retaining collar 9 in the passage opening 8. In this case, spacing remains between the connecting bush 12 and the passage opening 8, since the outer diameter $d_5$ is less than the inner diameter $d_3$. This spacing makes it possible for the retaining collar 9 to be radially displaced in the passage opening 8.

Owing to the two cover elements 10, 11, the retaining collar 9 ensures that radial sliding displacement on the base plate 30 of the holder 7 is possible. In order to ensure pretensioning between the holder 7 and the retaining collar 9, the first cover element 10 is formed as a plate which comprises a wave-shaped indentation 25 at each of its edges 22 and 23, which indentation can resiliently yield. The second cover element 11 conversely comprises bulges 24, which are supported on the base plate 30 of the holder 7 such that, after inserting the retaining collar 9 into the passage opening 8 via the insertion slot 13, the retaining collar is fixed to the base plate 30 in a slidingly displaceable manner.

The inner opening 39 of the retaining collar 9 always remains axially oriented during possible radial displacements. After sliding together the holder 7 and the retaining collar 9, the nut 4 comprising the bolt receptacle 6 can be displaced through the inner opening 39 in arrow direction B, as shown in FIG. 1, such that the legs 27 and 29 of the holder 7 engage over the edge faces 19 and 21 of the flange 5 of the nut 4. By pushing in the part 4, the spring element 16 is automatically blocked, and this makes non-destructive removal impossible. An assembled cage nut of this type can then be fixed to an abutment by means of the foot elements 35, 36 and 37 of the legs 27 and 29 and a screw bolt can be inserted, via the flange underside 32, into the nut 4 which is stably held in the axial direction.

FIG. 4 is a schematic longitudinal section through the cage nut 1 according to the first embodiment. In this longitudinal section, the three components, which have been described above with reference to FIGS. 1 to 3, are connected, such that the retaining collar 9 is arranged in the passage opening 8 of the holder 7 and covers the passage opening 8 with its cover elements 10 and 11. The connecting bush 12, which mechanically connects the cover elements 10 and 11 of the retaining collar 9, holds the nut 4 in the holder 7 in an axially oriented manner by means of a coaxial press fit. In addition, the nut 4 is fixed in the inner opening 39 of the connecting bush 12 by means of its threaded-sleeve-like bolt receptacle 6.

A region 41 projecting from the retaining collar 9 comprises caulked points 17 which are distributed over the periphery and prevent the bolt receptacle 6 from slipping out of the retaining collar 9. Opposite this region 41 of the nut 4 projecting from the retaining collar 9, the underside 32 of the radially protruding angular flange 5 is arranged, from which underside a screw bolt can be screwed into the internal thread 31 of the nut 4. Since the foot elements 37 and 38 of the leg 29 are materially connected to an abutment of a panel, the nut 4 is fixed against turning in the holder 7 by the rectangular flange 5.

Furthermore, the first cover element 10 of the retaining collar 9 produced from plastics material is adapted to the rectangular flange 5 such that the length $l_2$ shown in FIG. 3 is slightly greater than the length $l_1$, shown in FIG. 1, of the rectangular flange 5 and likewise the width $b_2$, shown in FIG. 3, of the first cover element 10 of the retaining collar 9 is greater than the width $b_1$ of the rectangular flange 5 shown in FIG. 1, which ensures that the rectangular flange 5 in the assembly as shown in FIG. 4 does not cause a short circuit, despite the radial displaceability of the retaining collar 9 in the passage opening 8, and the nut 4 remains isolated in all positions of the holder 7. No electrical contact with the body thus occurs, such that in cathodic dip coating in a cathodic dip coating bath, the nut and the internal thread thereof are not also coated.

FIGS. 5 to 8 show a cage nut 2 according to a second embodiment of the cage nut 1 described in FIGS. 1 to 4. Components in FIGS. 5 to 8 which have the same function as those in FIGS. 1 to 4 are denoted by identical reference signs and are not further discussed. It is easy to see that the nut 4 and the holder 7 in FIGS. 5 and 6 do not differ from the nut 4 shown in FIG. 1 and the holder 7 shown in FIG. 2, and therefore further discussion is unnecessary. A modified retaining collar 9' is only shown in FIG. 7 and differs from the retaining collar in FIG. 3 in that the connecting bush comprises a further slot, transverse to the insertion slot 13 shown in FIG. 2, as a free cut 42 in addition to the radial slots 14 and 15.

Said free cut 42 can be seen more clearly in FIG. 8, which is a schematic longitudinal section through the cage nut 2 according to the second embodiment. In this longitudinal section according to FIG. 8, the free cut 42 can be seen in the marked circle C, it being possible by means of this free cut 42 for the transverse resilient wave-shaped indentation 25 to be arranged considerably closer to the passage opening 8, whereby both the spring constant of the resilient wave-shaped indentation 25 can be reduced and a compact construction of the cage nut 2 is possible, since the longitudinal extension of the radially protruding flange 5 can be reduced. FIGS. 9 to 12 show a third embodiment of a cage nut 3, wherein here, too, components having the same functions as in the preceding figures are denoted by identical reference signs and are not further discussed. In this third embodiment, too, the nut 4, as can be seen in FIG. 9, and the holder 7, as can be seen in FIG. 10, remain unchanged, as already described with reference to FIGS. 1 and 2.

Only the retaining collar 9" differs from the preceding embodiment in that the lower cover element 10 has a planar surface, from which yielding bulges 24 project. Spring elements 26 protrude from the opposing cover element 11 towards the base plate 30, shown in FIG. 10, of the holder 7, which spring elements ensure that the retaining collar 9" can be inserted into the holder 7 under pretensioning. In this embodiment, too, by means of the size of the planar cover element 10 it is ensured that the radially protruding angular flange 5 cannot cause a short circuit between the holder 7 and the nut 4, despite the radial displaceability of the retaining collar 9" in the holder 7. Noise is also prevented by this new retaining collar 9".

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A cage nut including a retaining device, said cage nut comprising:

a nut (4) comprising a radially protruding angular flange (5) and a receptacle (6) for a bolt;

a holder (7) having a passage opening (8) through which the bolt receptacle (6) passes, the holder (7) being engagable over the angular flange (5); and a retaining collar (9), which surrounds the bolt receptacle (6) of the nut (4), and is supported on the holder (7) in a region of the passage opening (8), wherein the retaining collar (9) is in one piece and comprises first and second cover elements (10, 11) which cover the passage opening (8) of the holder (7) on both sides of the passage opening, and wherein the cover elements (10, 11) are mechanically connected via a connecting bush (12) which concentrically adjoins the bolt receptacle (6), and wherein the connecting bush (12) is radially spaced apart from the passage opening (8);

the holder (7) comprises an insertion slot (13) for inserting the retaining collar (9) into the passage opening (8); and the connecting bush (12) has radial slots (14, 15) in mechanical transitions into the cover elements (10, 11), the radial slots arranged such that the connecting bush (12) comprises opposing spring elements (16) for inserting the retaining collar (9) into the passage opening (8).

2. The cage nut according to claim 1, wherein the bolt receptacle (6) projects beyond the retaining collar (9) and comprises caulk points (17) distributed over a periphery of a projecting region.

3. The cage nut according to claim 1, wherein the first cover element (10) of the retaining collar (9) is arranged between the protruding angular flange (5) and the holder (7) and projects beyond edge faces (18 to 21) of the angular flange (5).

4. The cage nut according to claim 1, wherein the second cover element (11) is disc-shaped and does not project beyond the holder (7).

5. The cage nut according to claim 1, wherein the radially protruding angular flange (5) is rectangular, and the holder (7) comprises three angled legs (27, 28, 29) formed of a base plate (30) having the passage opening (8) therein, the three legs (27, 28, 29) being engageable over three edge faces (19, 20, 21) of the rectangular flange (5) of the nut (4).

6. The cage nut according to claim 1, wherein the nut (4) having the retaining collar (9) pretensioned in the holder (7) has greater radial displacement in a direction of an insertion slot (13) than in a direction transverse to the insertion slot (13).

7. The cage nut according to claim 1, wherein the nut (4) and the holder (7) are made of metal alloys, and wherein the retaining collar (9) is made of plastic material.

8. The cage nut according to claim 1, wherein the nut (4) is electrically insulated from the holder (7).

9. A cage nut including a retaining device, said cage nut comprising:

a nut (4) comprising a radially protruding angular flange (5) and a receptacle (6) for a bolt;

a holder (7) having a passage opening (8), through which the bolt receptacle (6) passes, the holder (7) being engagable over the angular flange (5); and a retaining collar (9), which surrounds the bolt receptacle (6) of the nut (4) and is supported on the holder (7) in the region of the passage opening (8);

wherein the retaining collar (9) is in one piece and comprises first and second cover elements (10, 11) cover the passage opening (8) of the holder (7) on both sides of the passage opening, and wherein the cover elements (10, 11) are mechanically connected via a connecting bush (12) which concentrically adjoins the bolt receptacle (6), and wherein the connecting bush (12) is radially spaced apart from the passage opening (8); and wherein the first cover element (10) is a plate which comprises resiliently pretensioned wave-shaped indentations (25) or bulges (24) at edges (22, 23) transverse to an insertion slot (13) relative to the holder (7).

10. A cage nut including a retaining device, said cage nut comprising:

a nut (4) comprising a radially protruding angular flange (5) and a receptacle (6) for a bolt;

a holder (7) having a passage opening (8), through which the bolt receptacle (6) passes, the holder (7) being engagable over the angular flange (5); and a retaining collar (9), which surrounds the bolt receptacle (6) of the nut (4) and is supported on the holder (7) in the region of the passage opening (8);

wherein the retaining collar (9) is in one piece and comprises first and second cover elements (10, 11) cover the passage opening (8) of the holder (7) on both sides of the passage opening, and wherein the cover elements (10, 11) are mechanically connected via a connecting bush (12) which concentrically adjoins the bolt receptacle (6), and wherein the connecting bush (12) is radially spaced apart from the passage opening (8); and wherein the second cover element (11) comprises, in edge regions of the second cover element (11), bulges (24) or resiliently pretensioned spring elements (26) which are transverse to an insertion slot (13) relative to the holder (7).

* * * * *